(12) United States Patent
Croxford et al.

(10) Patent No.: US 12,033,234 B2
(45) Date of Patent: Jul. 9, 2024

(54) GRAPHICS PROCESSING SYSTEM

(71) Applicant: Arm Limited, Cambridge (GB)

(72) Inventors: Daren Croxford, Swaffham Prior (GB); Guy Larri, Cambridge (GB); Julian Katenbrink, Ely (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/170,243

(22) Filed: Feb. 8, 2021

(65) Prior Publication Data

US 2022/0253966 A1 Aug. 11, 2022

(51) Int. Cl.
*G06T 1/20* (2006.01)
*G06T 15/00* (2011.01)

(52) U.S. Cl.
CPC .............. *G06T 1/20* (2013.01); *G06T 15/005* (2013.01); *G06T 2200/24* (2013.01); *G06T 2210/08* (2013.01)

(58) Field of Classification Search
CPC ..... G06T 1/20; G06T 15/005; G06T 2200/24; G06T 2210/08
See application file for complete search history.

(56) References Cited

U.S. PATENT DOCUMENTS

| | | | | |
|---|---|---|---|---|
| 8,582,650 B1* | 11/2013 | Masterson | ............. | H04N 19/40 375/240.18 |
| 9,922,006 B1* | 3/2018 | Boynes | .................. | G06F 16/95 |
| 2009/0231314 A1* | 9/2009 | Hanaoka | ............... | G09G 3/2096 345/84 |
| 2010/0189063 A1* | 7/2010 | Kokku | .................. | H04L 47/283 370/352 |
| 2011/0263332 A1* | 10/2011 | Mizrachi | ............... | A63F 13/358 463/42 |
| 2018/0063555 A1* | 3/2018 | Raduchel | ................ | G06F 9/452 |
| 2018/0286105 A1* | 10/2018 | Surti | .................. | H04N 5/23212 |
| 2019/0358541 A1* | 11/2019 | Bronder | ................ | H04L 67/131 |
| 2020/0084255 A1* | 3/2020 | McLoughlin | ........... | H04L 65/60 |
| 2021/0001216 A1* | 1/2021 | Sanders | ................ | A63F 13/573 |
| 2021/0240258 A1* | 8/2021 | Son | ........................... | G06F 3/14 |
| 2021/0377866 A1* | 12/2021 | Kim | .................. | H04W 52/0251 |
| 2022/0116441 A1* | 4/2022 | Liu | ......................... | H04L 65/70 |

\* cited by examiner

*Primary Examiner* — Sing-Wai Wu
*Assistant Examiner* — Khoa Vu
(74) *Attorney, Agent, or Firm* — Leveque Intellectual Property Law, P.C.

(57) ABSTRACT

The present disclosure relates to a method of operating a graphics processing system for providing frames over communication channel in a communication network, the graphics processing system being configured to process data for an application executed thereon to render frames for the application to be output for transmission over the communication channel to a client device, the method comprising: determining network characteristics of the communication network and/or server characteristics of the server; adaptively selecting a first prediction method from a plurality of prediction methods to be used for displaying frames based on the determined network characteristics and/or server characteristics; generating a plurality of frames based on the first prediction method; and selectively providing, based on the first prediction method, one or more output frames from the plurality of frames to the application to be output for transmission over the communication channel.

14 Claims, 6 Drawing Sheets

GRAPHICS PROCESSING SYSTEM

FIELD OF THE INVENTION

The present disclosure relates to graphics processing systems. In particular, the present disclosure relates to graphics processing systems that provide image frames for an application such as games, graphical user interface GUI, collaborative video conferencing, or remote desktop.

BACKGROUND

FIG. 1 shows an exemplary system on chip (SoC) graphics processing system 10 that comprises a host processor comprising a central processing unit (CPU) 1, a graphics processing unit (GPU) 2, a display controller 4, and a memory controller 6. The exemplary graphics processing system 10 may also comprise a video engine 3. As shown in FIG. 1, these units communicate via an interconnect 5 and have access to off-chip memory 7. In this system, the GPU 2 renders image frames to be displayed, and the display controller 4 then provides the frames to a display panel 8 for display.

In use, an application, such as a game, being executed on the CPU 1 may, for example, require the display of frames on the display panel 8. In this case, the application submits appropriate commands and data to a driver for the GPU 2 that is being executed on the CPU 1. The driver then generates appropriate commands and data to cause the GPU 2 to render appropriate frames for display and to store those in appropriate frame buffers, e.g. in the main memory 7. The display controller 4 then reads those frames into a buffer for the display, from where the frames are then read out and displayed on the display panel of the display panel 8. The GPU 2 is configured to render frames at an appropriate rate, such as 30 frames per second (fps), 60 fps, or at a lower or higher frame rate as appropriate.

The display controller 4 in FIG. 1 is provided as part of the same SoC 10 as the CPU 1 and GPU 2, such that the processing for producing the frames to be displayed for the application is performed locally to the control of which frames are displayed, e.g. as part of a dedicated gaming console or a personal computer.

There may be a significant amount of processing power required for producing frames for display of a given application. For example, and especially, more recent gaming applications that involve high-resolution and expansive scenes, and may involve the use of virtual reality (VR) or augmented reality (AR). In the system of FIG. 1, this would require a user to have a relatively high-end hardware system such as a dedicated gaming console or a high-end graphics card in order to provide a smooth gaming experience. Such a high-end system is expensive and consumes a large amount of energy when running.

More recently, it has been proposed to migrate at least some of the processing into the cloud, whereby the application is executed, and the frames for display produced, at a cloud server remotely from the display. This allows at least some of the processing burden to be shifted from the user's device to the cloud server, thereby potentially avoiding the need for the user to purchase an expensive hardware system and reducing the amount of energy consumed locally on the user's device. As the bulk of the processing is performed at the cloud server rather than on the user's device, a corresponding increase in bandwidth requirement for transmitting the produced frames over the network connection is expected. Moreover, this approach can also introduce problems of latency depending on the available network resources, which may result in poor user experience.

This latency may be especially significant for gaming systems as well as for VR or AR systems, where the content of the frames that need to be generated for the application depends in part on the actions of the user, which are expected to be frequent (compared for example to video streaming). In this case, it would be desirable to minimize latency between the user taking an action and the consequential frames being generated and latency between the frames being generated and the user's device receiving the frames to provide the user with as near to a real-time experience as possible.

It is therefore desirable to provide improved methods of operating graphics processing systems in a case where the graphics processing is performed remotely to a display device.

BRIEF DESCRIPTION OF THE DRAWINGS

Embodiments will now be described with reference to the accompanying drawings, in which.

DETAILED DESCRIPTION

Figure 1:
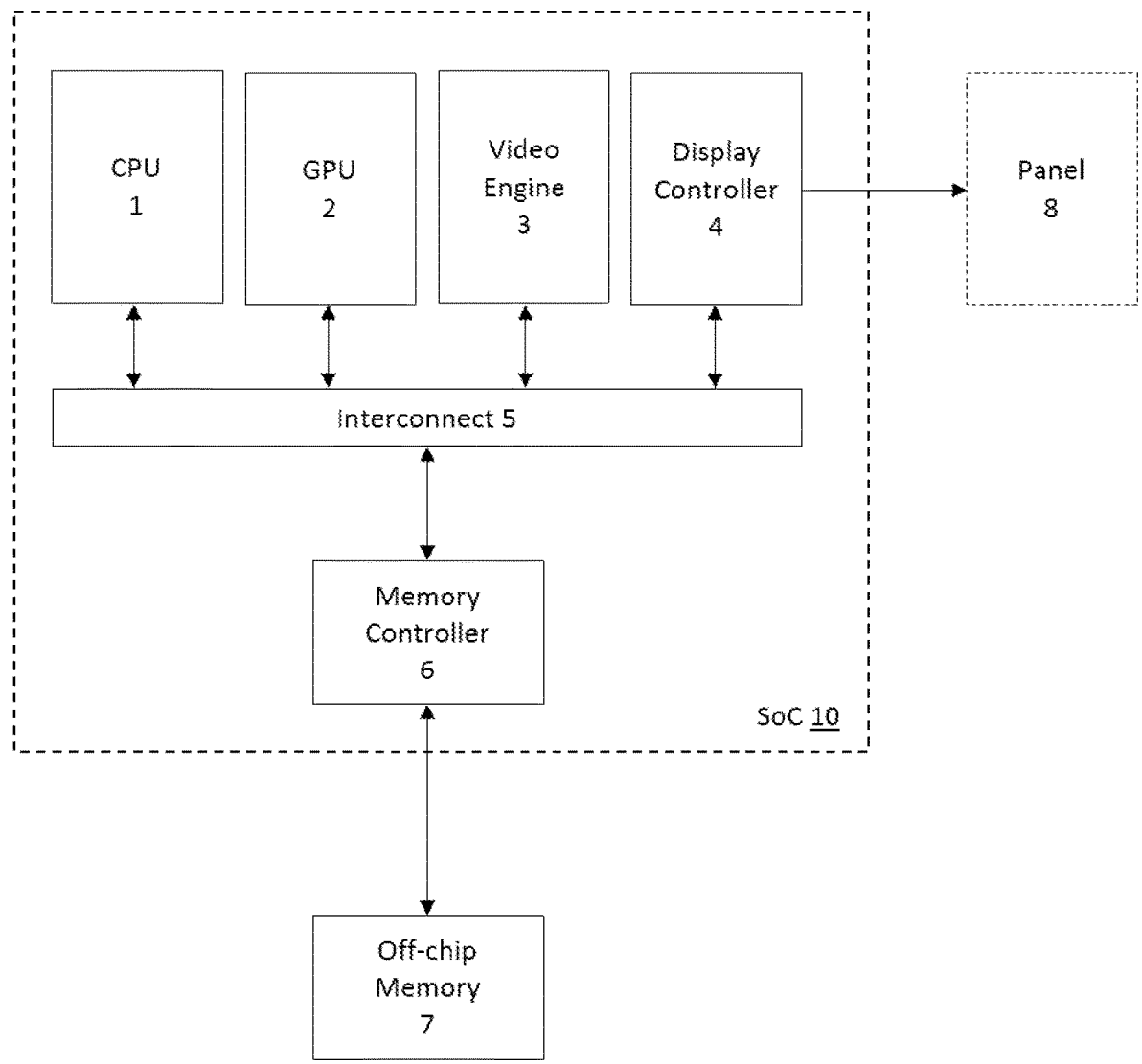
FIG. 1 shows an example of a graphics processing system.

Techniques disclosed herein relate to a graphics processing system wherein frames are produced remotely in the cloud (e.g. at a cloud-based server) and then transmitted to a client device for displaying locally to a user on a display (e.g. a screen or a head-mounted display). The present techniques seek to address latency and bandwidth requirement arising from producing frames for an application remotely, by adaptively applying a prediction method to the frames to provide a smooth real-time experience.

An aspect of the techniques described herein provides a method of operating a graphics processing system on a server for providing frames over a communication channel in a communication network, said graphics processing system being configured to process data for an application executed thereon to render frames for said application to be output for transmission over said communication channel to a client device, the method comprising: determining network characteristics of said communication network and/or server characteristics of said server; adaptively selecting a first prediction method from a plurality of prediction methods to be used for displaying frames based on the determined network characteristics and/or server characteristics; generating a plurality of frames based on said first prediction method; and selectively providing, based on said first prediction method, one or more output frames from said plurality of frames to said application to be output for transmission over said communication channel.

Another aspect of the present techniques provides a graphics processing system on a server comprising: a host processor operable to execute an application; a graphics processor operable to process data for said application to render frames for said application to be output for transmission over a communication channel; output circuitry configured to output frames rendered for said application by said graphics processor for transmission over said communication channel; and control circuitry configured to: determine network characteristics of said communication network and/or server characteristics of said server; adaptively select a first prediction method from a plurality of prediction methods based on the determined network characteristics and/or server characteristics; generate a plurality of frames for display based on said first prediction method; and selectively provide, based on said first prediction method, one or more output frames from said plurality of frames to said application to be output by said output circuitry.

In embodiments of the techniques described herein, the graphics processing system is operated to provide frames over a communication network for display remotely. For example, the graphics processing system may be implemented in a cloud-based server to provide frames for an application being executed on the server but receiving user inputs from a user device (also client device or local device) remotely connected to the server over a communication channel in the communication network, and the frames may be transmitted over the communication channel to the user device for display. Herein, a communication network may comprise one or more communication channels, and a user device may connect to the server over any one of the communication channels and selectively switching between channels. With this arrangement, there may be latencies between user inputs being received at the user device and sent to the server, to frames being produced at the server and displayed at the user device. The latencies may for example be associated with the communication channel or the whole or part of the communication network when relaying the inputs from the user device to the server and/or when sending the produced frames to the user device, and/or associated with the generation of the frames. Moreover, as applications become more complex, there may be an increase in demand for bandwidth to transmit the data required for running an application remotely.

According to embodiments of the present techniques, the graphics processing system determines network characteristics of the communication network and/or server characteristics of the server, and adaptively selects a first prediction method from a plurality of prediction methods to be used for displaying frames at the user device. For example, network characteristics may include latency and/or bandwidth availability of one or more channels of the communication network, stability of one or more channels, and other characteristics in relation to one or more channels of the network or the network itself, and server characteristics may include server capacity, server latency, server processing power, etc. The plurality of prediction methods may, in some embodiments, be stored in a memory unit on the server, for example as part of the graphics processing system. The first prediction method is selected from the plurality of prediction method adaptively based on the current network characteristics of the communication network and/or server characteristics of the server at the time of selection. The graphics processing system then generates a plurality of frames based on the adaptively selected first prediction method, and selectively provides one or more frames (output frames) from the plurality of generated frames to the application based on the adaptively selected first prediction method. The one or more output frames selectively provided to the application are to be output for transmission over the communication channel for display (e.g. after processing) at the user device. In some cases, the one or more output frames may be sent to the user device together with an indication that indicates the first prediction method as being selected, such that the client device may apply the first prediction method to the frames upon receiving them. By adaptively selecting, based on the available network resource, a prediction method that determines how frames are generated and selected for provision to the application, it is possible to adaptively operate a graphics processing system to remotely provide frames for an application in a way that is tailored for the current network characteristics of the communication network and/or server characteristics of the server.

The plurality of prediction methods may comprise various suitable and desirable methods that can determine how frames are generated and selected for provision to the application. In some embodiments, the plurality of prediction methods may define one or more criterion under which frames are generated and selected for provision. In an embodiment, the one or more criterion may limit the size of an output frame to reduce the amount of data that needs to be transmitted. In another embodiment, the one or more criterion may limit the number of output frames that can be sent in a given time interval to reduce the frequency of transmission.

In some embodiments, the method may further comprise determining a transmission frame rate at which frames are to be transmitted over the communication channel based on the network characteristics of the communication network and/or server characteristics of the server, and outputting the one or more output frames for transmission at the transmission frame rate. In doing so, frames may be transmitted at a rate that is compatible with current network characteristics of the communication network and/or server characteristics of the server. In an embodiment, the plurality of frames may be generated based on a display frame rate at which frames are to be displayed at said client device.

In some embodiments, the first prediction method may comprise generating the plurality of frames as a plurality of frame sequences, wherein each frame sequence comprises a respective sequence of one or more frames corresponding to a different predicted future state for the application. In an embodiment, selectively providing one or more output frames may comprise selectively providing a subset of the generated frame sequences corresponding to a respective subset of predicted future states for the application. This is a technique generally known as negative latency, in which the graphics processing system predicts a number of possible actions that the user may take, that would lead to a number of respective possible future states, and for each possible future state generates a corresponding frame or frame sequence. By generating a plurality of predicted frames or frame sequences corresponding to a plurality of possible future states for the application, it is possible to reduce the effect of latencies associated with the communication channel being used and/or the communication network as a whole, as well as latencies associated with the generation of frames.

In some embodiments, the first prediction method may comprise outputting the one or more output frames at an image quality lower than an image quality for display, and providing each of the one or more output frames with one or more motion vectors, wherein each motion vector represents a motion of a region of a respective output frame to be used for predicting a position of the region. Herein, a region may include a pixel, a group of predetermined number of pixels, an object primitive or an object within the frame. This is a technique generally known as temporal anti-aliasing or machine learning super sampling (e.g. DLSS™). In an embodiment, a frame may be rendered at a higher image quality by determining the motion of moving objects in the frame, for example by combining, for each region (e.g. a pixel), the data of the region and a corresponding region from one or more preceding frames, which data may be adjusted for movement using motion vectors that represent the motion of each region. A corresponding region may, in an embodiment, be a region at the same sampling position in a preceding frame as the region in question from the current frame, or it may, in another embodiment, be a region in the preceding frame that corresponds to the same part of an object as the region in question (which may not be at the same sampling position as the object may have moved with respect to the preceding frame) and its position may for example be determined using a motion vector representing the motion of the region in question. By generating and therefore outputting frames at a lower image quality, it is possible to reduce the effect of latencies associated with the generation of the output frames and bandwidth required for transmitting the output frames. The prediction method may, in an embodiment, be correspondingly applied at the user device to bring the image quality of the output frames to the display image quality. In an embodiment, the method may further comprise determining the image quality at which the one or more output frames is to be output based on the available network resource of said communication network. In doing so, it is possible to output frames at a size or quality level that can be accommodated by the communication network and the server.

In some embodiment, the first prediction method may comprise providing each of the one or more output frames with respective extrapolation information, wherein the extrapolation information is to be used for generating a predicted frame by applying the first prediction method to the one or more output frame. This is a technique generally known as asynchronous space warp, which can be used e.g. in VR/AR applications to increase the frame rate for frames to be displayed at the user device, e.g. by extrapolating one or more intermediate frames to increase the number of frames for display. In an embodiment, the graphics processing system may selectively provide some, but not all, of the generated plurality of frames as output frames to the application to be output for transmission. For each of the output frames, extrapolation information may be provided with the output frame, and, in an embodiment, using the extrapolation information that accompanies the output frame, the user device may extrapolate from the (current) output frame one or more predicted frame subsequent to the output frame by applying the first prediction method using the extrapolation information and the output frame, effectively increasing the number of frames to be displayed at the user device. By providing extrapolation information to be used for generating predicted frames for display together with the one or more output frames, it is possible to enable the user device to display frame at a desirable frame rate that provides a real-time or near real-time experience irrespective of potential latencies associated with the communication channel or the communication network as a whole and bandwidth requirement.

In some embodiments, the extrapolation information may comprise image data corresponding to a respective output frame. Additionally or alternatively, the extrapolation information may comprise one or more motion vector each representing a motion of a region of a respective output frame. Additionally or alternatively, the extrapolation information may comprises depth information representing a depth of one or more region of a respective output frame. The extrapolation information may comprise one or more of the above alternatives.

In some embodiments, the plurality of frames may comprise a sequence of frames, and selectively providing one or more output frames from the plurality of frames to the application may comprise providing a subset of frames from the sequence of frame, and the predicted frame corresponds to a frame from the sequence of frames other than the subset of frames. In an embodiment, the subset of frame may comprise every other frame of the sequence of frames. In these embodiments, upon receiving the output frames and corresponding extrapolation information, the user device may extrapolate from an output frame using the respective extrapolation information for that output frame a predicted frame that is subsequent to the output frame. In doing so, the graphics processing system is able to provide frames to the user device in such a way that allows the user device to display a sequence of frames at a higher rate than the rate at which frames are transmitted by the server over the communication network, without the server having to output all the frames of the sequence for transmission, by the user device displaying both output frames and predicted frames.

In some embodiments, the predicted frame corresponds to an unsent frame that is a frame from the generated plurality of frames other than the one or more output frames, and the method may further comprise generating a predicted frame by applying the first prediction method using the extrapolation information, and determining a difference between the predicted frame and the unsent frame. In an embodiment, the method may further comprise comparing the difference with a predetermined threshold, and providing the unsent frame to the application to be output for transmission if it is determined that the difference is at or above the predetermined threshold. In another embodiment, the method may further comprise providing the difference to the application to be output for transmission if it is determined that the difference is at or above the predetermined threshold. By determining a difference between the predicted frame and the corresponding unsent frame, it is possible to determine if an error has occurred in the extrapolation of a predicted frame that results in a difference between what is predicted (the predicted frame) and what is expected (the unsent frame). By comparing the difference with the predetermined threshold, it is possible to assess the extent of the error and to correct the error if necessary. By outputting the unsent (expected) frame for transmission, it enables the user device to straightforwardly replace the frame extrapolated at the user device with the expected frame. By outputting the difference for transmission, it enables the user device to correct the error in the predicted frame by for example combining the predicted frame and the difference between the predicted and generated frame.

In some embodiments, the method may further comprise adaptively selecting a second prediction method from the plurality of prediction methods to be used in conjunction with the first prediction method for displaying frames based on the available network resource of the communication network, wherein the plurality of frames are generated based on the first prediction method and the second prediction method, and the one or more output frames are selectively provided to the application based on the first prediction method and the second prediction method. By adaptively selecting a second prediction method, and generating and selectively providing frames based additionally on the second prediction method, it is possible to further reduce the effect of latencies and/or bandwidth limitations.

In some embodiments, the method may further comprise applying a compression algorithm to said one or more output frames, and outputting the compressed output frames for transmission. The output frames may be compressed to facilitate their storage and/or transmission. For example, where the frames are produced remotely, e.g. in the cloud, and then transmitted over a network connection (e.g. a wireless network connection) to a client device for processing for display. In order to reduce bandwidth requirements, the frames may be compressed and transmitted in a compressed format. Similarly, the frames may be compressed for storage in memory before being displayed (or transmitted for display). The graphics processing system may therefore in some embodiments comprise a compression unit that is configured to compress frames that are produced by the graphics processor. Correspondingly a suitable decompression unit may be provided at the client device for decompressing the compressed frames when required, e.g. for display. Any suitable and desirable compression schemes and algorithms, lossless or lossy, may be used for compressing the output frames.

In some embodiments, the transmission frame rate may be set to be the same as the display frame rate, for example, when latency is low and/or there is good bandwidth availability in the communication channel. In some embodiments, the transmission frame rate may be set to be less than the display frame rate, for example when there is latency and/or bandwidth availability is limited. In an embodiment, the transmission frame rate may be set at half of the display frame rate, for example by only outputting every other generated frame.

In some embodiments, the method may further comprise periodically repeating the determination of available network resource and the adaptive selection of a first prediction method. Additionally or alternatively, the method may further comprise repeating the determination of network characteristics of the communication network and/or server characteristics of the server and the adaptive selection of a first prediction method upon detecting a change in the network characteristics of the communication network and/or server characteristics of the server. By repeatedly determining the transmission frame rate and adaptively selecting the first prediction method, either periodically or in response to a change in network resource availability, it is possible to account for fluctuations in the communication network and instabilities in one or more channels in the network, and continually adapting the operation of the graphics processing system to the communication network and the server.

In present embodiments, the available network resource may comprise a bandwidth and/or a latency of the communication network. However, it will be appreciated that there may be other factors that affect the capacity of the communication network that can be regarded as network resources.

A further aspect of the present techniques provides a computer-implemented method of displaying frames for an application at a client device connected to a server via a communication channel in a communication network, the method comprises: receiving a plurality of input frames and an indication indicating a first prediction method from a plurality of prediction methods to be applied to said plurality of input frames; applying said first prediction method to said plurality of input frames to process one or more frames for display; and outputting said one or more frames for display. Upon receiving a plurality of frames from a graphics processing system (e.g. on a cloud-based server) transmitted over a communication network, and an indication for a first prediction method to be applied to the frames, the client device (user device) applies the first prediction method to the received frames to render frames for display. In embodiments, the plurality of prediction methods may determine various different operations to be performed on the received frames e.g. to manipulate the received frames, to generate further frames from the received frames, or to simply select the appropriate frames from the received frames, etc. By applying the first prediction method indicated by the graphics processing system at the server, it is possible for the client device to process and display frames as intended by the application being executed on the graphics processing system on the server even when the received frames may not be in a form intended for display by the application.

Alternatively or additionally, the graphics processing system at the server may not or may be unable to provide an indication to a client device to indicate which prediction method is to be applied to the input frames at the client device. Thus, a yet further aspect of the present techniques provides a computer-implemented method of displaying frames for an application at a client device connected to a server via a communication channel in a communication network, the method comprises: receiving a plurality of input frames; determining a prediction method to be applied to said plurality of input frames based on the received input frames and/or performance characteristics of said client device; applying said prediction method to said plurality of input frames to process one or more frames for display; and outputting said one or more frames for display. In some embodiments, it may be desirable for the client device to determine which of a plurality of prediction methods to apply to the received frames. For example, performance characteristics (e.g. processing power, display resolution, memory capacity, etc.) of a client device may vary from time to time or from device to device, and it may therefore be desirable to determine an appropriate prediction method to apply to the received frames at the client device at the time of receiving the frames.

In some embodiments, the plurality of input frames may correspond to a plurality of frame sequences each comprises a respective sequence of one or more frames corresponding to a different possible future state for the application, wherein applying the first prediction method to the plurality of input frames may comprise receiving a user input and selecting a frame sequence based on the user input. This is a technique generally known as negative latency, in which a number of frame sequences, corresponding to different possible future states of the application based on predictions of the possible actions that the user may take, are received in advance of when these frame sequences may be needed (when the user provides an input), then the appropriate frame sequence is selected once the correct future state is determined (when a user input is received). By receiving a plurality of frame sequences corresponding to different possible future states in advance of the user providing user inputs, it is possible to reduce the effect of latencies associated with the generation of the frames and associated with the communication network.

In some embodiment, the method may further comprise receiving one or more motion vectors for a plurality of regions for the plurality of input frames, wherein each motion vector represents a motion of a region of a respective input frame, wherein applying the first prediction method to the plurality of input frames comprises predicting a position of each region of the plurality of regions using a respective motion vector to render the one or more frames for display at a higher image quality than the plurality of input frames. Herein, a region may be a pixel, a group of predetermined number of pixels, an object primitive or an object within the frame. This is a technique generally known as temporal anti-aliasing or machine learning super sampling (e.g. DLSS™), in which a current frame may be rendered at a higher image quality by combining, for each region (e.g. a pixel), data of the region of the current frame with a corresponding region from one or more processed preceding frames. A corresponding region may, in an embodiment, be a region at the same sampling position in a preceding frame as the region in question from the current frame, or it may, in another embodiment, be a region in the preceding frame that corresponds to the same part of an object as the region in question (which may be at a different position due to the motion of the object with respect to the preceding frame) and its motion may for example be determined using a motion vector representing the motion of the region in question. By receiving an input image frame at a lower image quality and then rendering the input frame for display at a higher image quality, it reduces the size of the image to be transmitted, which image may be compressed better and therefore requires less bandwidth and time to transmit. It is therefore possible to reduce the effect of latencies and bandwidth limitations in the communication channel or the communication network as a whole.

In some embodiments, the method may further comprise receiving extrapolation information for the plurality of input frames, wherein applying the first prediction method to the plurality of input frames comprises, for each input frame: determining one or more objects in the input frame; determining motion of each determined object in the input frame using the extrapolation information; and extrapolating a predicted frame based on the determined motion of each determine object. In an embodiment, the extrapolation may comprise one or more or a combination of image data corresponding to the current and/or one or more preceding input frames, one or more motion vector each representing a motion of a region of a respective input frame, or depth information comprising a depth of one or more region of a respective input frame. This is a technique generally known as asynchronous spacewarp, in which one or more intermediate frames can be generated from a received frame, which intermediate frames are extrapolated from the expected positions of the objects in the received frame. In the embodiments, an input frame may be received with corresponding extrapolation information that provides the client device with information about one or more objects in the input frame, to determine for example the motion of the objects, the depth of the objects (e.g. which distinguishes an object from a background of the same colour), and/or the expected changes in the perspective of scene based on previous user input (e.g. by tracking the head movement of the user for a VR/AR headset). By generating one or more frame that is subsequent to the received input frame based on predicted positions of the objects in the input frame, the number of frames to be displayed may be increased, and it is therefore possible for the client device to display frames at a frame rate higher than the frame rate at which frames are transmitted. This may be especially significant when the content of the frames that need to be generated for the application depends in part on the actions of the user and it is desirable to reduce the effect of latency between the user taking an action and the consequential frames being generated in order to provide the user with a real-time experience.

In an embodiment, the method may further comprise receiving a difference between the predicted frame and an expected frame, and correcting the predicted frame based on the difference. Additionally or alternatively, the method may further comprise receiving an expected frame and replacing the predicted frame by the expected frame. There may be instances when an error occurs in the generation of a predicted frame, and instances when the error in the predicted frame is determined to be unacceptably high. In this case, by either correcting for the difference between the predicted frame and the frame that is intended by the application being executed on the server (expected frame), or by replacing the predicted frame by the expected frame, it is possible to ensure that the client device displays frames that are intended for display by the application even when the client device does not always receive all the frames generated by the graphics processing system for display.

As will be appreciated from the above, the techniques described herein is, in an embodiment, implemented in and as part of an overall graphics processing system that includes one or more of processing elements such as a host processor (central processing unit CPU) and/or a graphics processing unit (GPU), a display controller, a video processor (codec), a system bus, and a memory controller.

The host processor may execute applications that can require graphics processing by the GPU, and send appropriate commands and data to the GPU to cause it to perform graphics processing operations and to produce graphics processing (render) output required by applications executing on the host processor. To facilitate this, in some embodiments, the host processor may also execute a driver for the GPU and a compiler or compilers for compiling shader programs to be executed by programmable shading stages of the GPU. In an embodiment, the compiler or compilers may be a part of the driver. Thus, in an embodiment, the GPU is in communication with a host microprocessor that is part of the overall graphics processing system, that executes a driver for the GPU and/or a compiler or compilers for the GPU.

Similarly, in some embodiments, there may be provided an application on the host processor that indicates a requirement for performing processing operations in the manner of the techniques described herein, which requirement is then recognised by, e.g. the driver being executed on, the host processor, the host processor may then operate to instruct the GPU to render data accordingly.

In some embodiments, the GPU may include any one or more (or all) of the processing stages that a GPU normally includes. Thus, for example, the GPU may in some embodiments include a primitive setup stage, a rasteriser, ray-tracing, hybrid ray-tracing and a renderer, etc. In an embodiment, the renderer is in the form or includes a programmable fragment shader.

In some embodiments, the GPU is a tile-based graphics processing unit comprising a tile buffer for storing tile sample values and/or write out unit that operates to write the data in the tile buffer (e.g. once the data in the tile buffer is complete) out to external memory (e.g. to a frame buffer).

In some embodiments, the GPU and/or host microprocessor may be in communication with a display for displaying the images generated by the GPU. Thus, the graphics processing system may further comprise a display panel for displaying the images generated by the GPU, e.g. via the display controller. The display panel may be integrated into the device, or it may be in communication with the device via a cable/connector (e.g. HDMI cable/connector), or in communication with the device wireless (e.g. via a Wi-Fi connection).

In embodiments, the display and display controller are associated with a user device, whereas the GPU and/or host microprocessor reside at a remote server, e.g. in the cloud. As such, the required data (e.g. the output frames) may be transmitted from the server to the user device over a suitable communication channel in a communication network. Thus, in some embodiments, the host processor and graphics processor may be implemented in a cloud-based server that further includes a network interface for transmitting data to a client (user) device. The client device may be any suitable and desirable user device, for example a personal computer, smartphone, tablet, etc. It will be appreciated that, because the bulk of the processing is performed at the cloud-based server, the client device may be of a relatively lower specification compared to when e.g. all of the graphics processing is performed on the client device.

In use, frames are therefore produced at the cloud-based server, and then transmitted over the communication channel to the client device. The frames may then be provided to a display controller of the client device which processes and selects frames for display, e.g. on a display panel of the user device. The client device may also include an input circuit for receiving user inputs that can be transmitted back along the communication channel to the server to control progression of the application.

In embodiments, the client device may also include one or more local processing units such as a local processor (CPU), local graphics processing unit (GPU), etc., that may perform some of the required processing. For example, the local processor may control the collecting and processing of the user inputs, as well as the transmission of data to the server, receiving data from the server, selecting appropriate frames for display, sending the appropriate frames to the display controller, etc. The local graphics processing unit may perform any further graphics processing required for preparing the frames for display. For example, if the game is executing in a GUI, the local graphics processing unit may combine (composite) the frames received from the server as appropriate with other image content.

The graphics processing system may, in embodiments, be in communication with a memory in which images generated by the GPU may be stored, e.g. for subsequent processing (e.g. via a memory controller). Thus, in an embodiment, the graphics processing system and/or unit comprises, or in communication with, one or more memories or memory devices that store the data described herein, and/or that store software for performing the processes described herein. Where the graphics processing system resides partly at a remote server, e.g. in the cloud, and partly at a client device, the server and client device may each have associated memory in which frames may be stored, e.g. for subsequent processing before transmission and/or display.

It will be appreciated by those skilled in the art that aspects and embodiments of the present techniques described herein may include, as appropriate, any one or more or all of the features described herein.

Embodiments of the disclosed techniques will now be described with reference to the drawings.

As stated above, the present techniques relate to a graphics processing system in which frames are produced remotely, e.g. in the cloud, and then transmitted to a client device (user device) for displaying locally to a user. An example of such a system may be configured as shown in FIG. 2.

Figure 2:
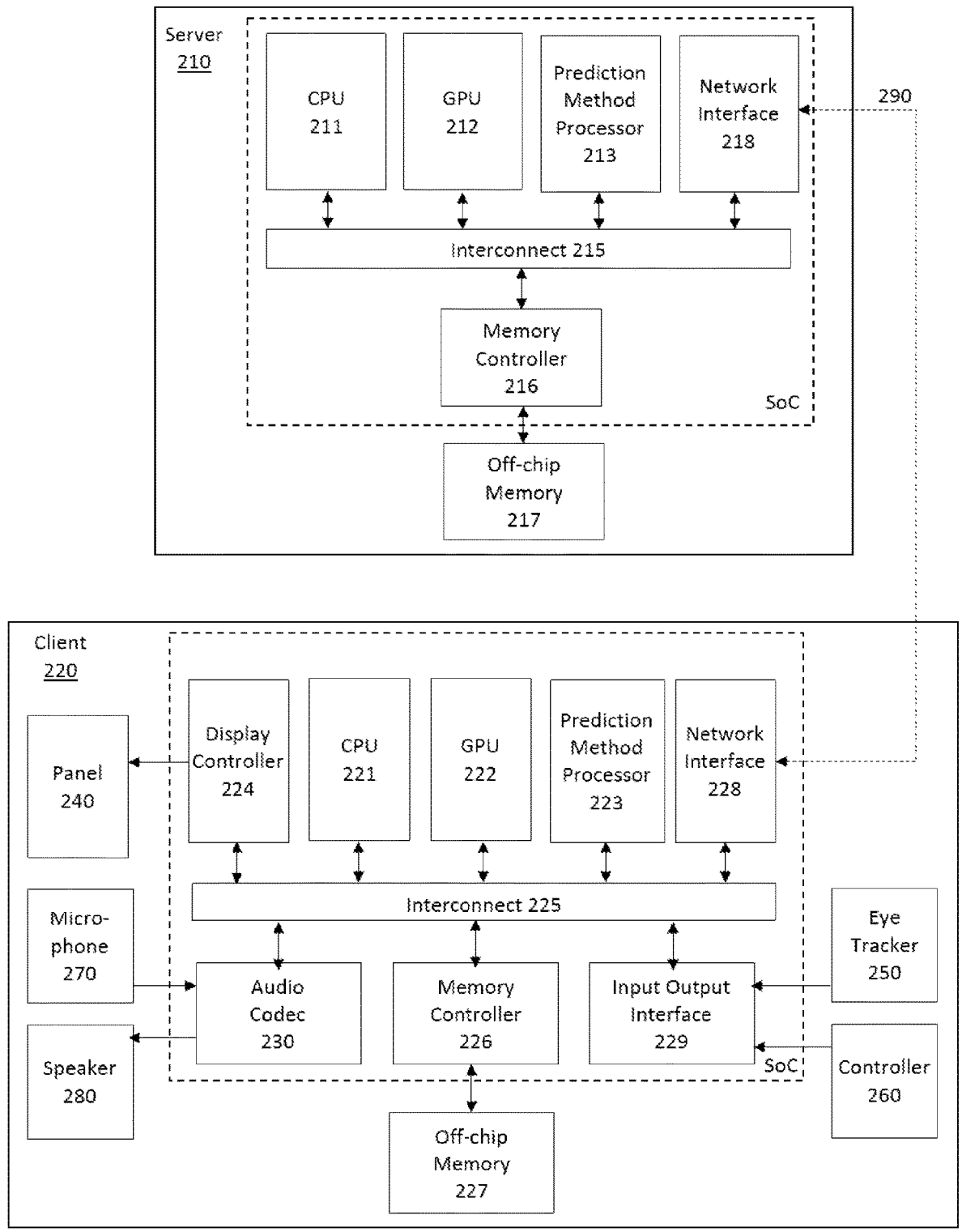
FIG. 2 shows another exemplary graphics processing system.

FIG. 2 shows an exemplary graphics processing system according to an embodiment of the present techniques. The graphics processing system comprises one or more processing elements, for example a host processor (211 that is hosting the application and a graphics processing unit (GPU) 212 that is performing graphics processing for the CPU 211, that reside in a cloud-based server 210, whereas a display controller 224 resides on a client device 220 remotely connected to the cloud-based server 210. The client device 220 may for example include a personal computing device such as a smartphone, a tablet computer, a laptop computer, a desktop computer, a TV, a set-top box, a TV adaptor (e.g. a streaming stick), a streaming game console, etc.

In the present embodiment, the cloud-based server 210 comprises a host processor comprising the central processing unit (CPU) 211, the graphics processing unit (GPU) 212, and a network interface 218, communicating via an interconnect 215 and having access to storage such as off-chip memory 217 controlled by a memory controller 216. The GPU 212 is configured to perform graphics processing to render frames to be displayed.

When an application, such as a game, that is being executed on the CPU 211 in the cloud-based server 210 requires the display of frames on a local display panel 240 of the client device 220, the application submits appropriate commands and data to a driver for the GPU 212 that is being executed on the CPU 211. The driver generates appropriate commands and data to cause the GPU 212 to render appropriate frames for display. The rendered frames are then compressed, e.g using a video codec unit (not shown), and the compressed frames are passed to the network interface 218 and transmitted over a suitable wireless or wired network connection 290 to the client device 220.

In the present embodiment, the client device 220 then decompresses the frames, e.g. using a video codec unit (not shown), and performs any other suitable and desirable processing of the frames to prepare them for display under the control of the display controller 224 of the client device 220. The display controller 224 reads the processed frames into a buffer for the display 240, from where the frames are read out and sent to the display panel 240 for display.

In the present embodiment, the client device 220 comprises its own processing elements such as local processor CPU 221 and local graphics processing unit GPU 222 that are operable to perform some of the required processing for preparing the frames for display. The client device 220 may further have access to storage such as an off-chip memory 227 controlled via a memory controller 226. Frames received from the cloud-based server 210 may be held in the off-chip memory 227, e.g. in a frame buffer, and then provided to the display controller 224 when the frames are required for display.

In the present embodiment, the client device 220 comprises an input/output interface 229 for receiving user inputs for controlling the application being executed on the CPU 211 on the cloud-based server 210. The input/output interface 229 may, for example, be configured to receive inputs from e.g. a control pad 260 (and a mouse, keyboard, joystick, hands-on throttle and stick, etc.), and, optionally, one or more sensors such as an eye (or head-movement) tracker 250 for monitoring the user's activity. The user inputs are processed by the local CPU 221 at the client device 220 and communicated back to the cloud-based server 210 over the network connection 290 for determining the progression (state) of the application. The user inputs are also provided to the local CPU 221 to determine which frames to display, and the information is passed to the display controller 224.

In the present embodiment, the client device 220 further comprises an audio codec 230 that processes audio content for the application. The audio codec 230 may, for example, receive user inputs from a microphone 270. The audio codec 230 also controls the audio output for the application, for example provided via a speaker 280. The audio processing may be performed locally at the client device 220. Alternatively, it may be desirable to perform the audio processing at the cloud-based server 210.

In the system of FIG. 2, large amounts of data need to be processed and transmitted over the network connection 290, from receiving and sending user inputs from the client device 220 to the server 210, to processing the user inputs, rendering and then sending frames from the server 210 to the client device 220. The large amount of processing required in response to user inputs may lead to latencies in the application's response as perceived by the user. Furthermore, the amount of data that can be sent in any given time may be limited by latencies in a particular communication channel or the communication network as a whole, the capacity of the communication channel (bandwidth), bandwidth availability due to current usage, as well as the capacity an processing capability of the server. These limitations on based on the network characteristics of the communication network can have a negative effect on user experience.

To address this, in the embodiments, the graphics processing system is operated such that a prediction method is applied when frames are generated and provided for display, wherein the prediction method is adaptively selected from a plurality of prediction methods based on the network characteristics of the communication network and/or server characteristics of the server. A corresponding prediction method is then applied to the frames upon receipt at the client device 220. This is facilitated by a prediction method processor 213 at the server 210 and a corresponding prediction method processor 223 at the client device 220. The prediction method processors 213 and 223 may be separate from, or be part of, the respective CPU 211 of the server and CPU 221 of the client device. The plurality of prediction methods is implemented to reduce the effect of latencies and/or bandwidth limitations to provide a real-time or near real-time experience.

Figure 3:
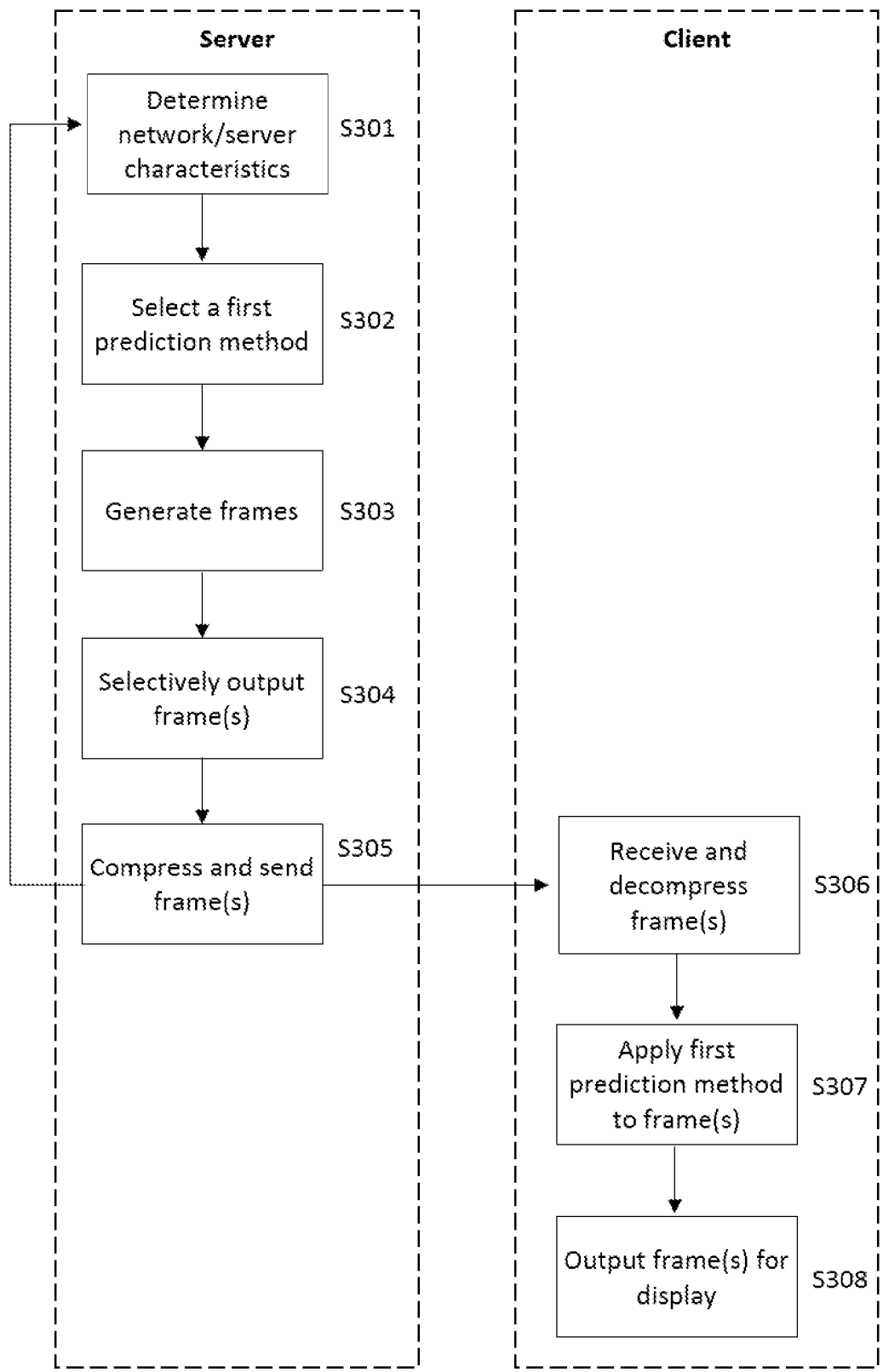
FIG. 3 shows a flow diagram illustrating a method of operating a graphics processing system according to an embodiment.

FIG. 3 shows an exemplary method of operating a graphics processing system, such as the graphics processing system of FIG. 2, for providing frames produced by a cloud-based server over a communication channel in a communication network to a client device. In the embodiment, the method begins at S301 at the server with the graphics processing system determining the network characteristics of the communication network and/or server characteristics of the server, for example, so as to determine the current latencies in the communication network, bandwidth availability and/or processing capability of the server. The process may be prompted by the client device receiving user inputs and sending the user inputs to the server; however, this is not essential, and the process may begin without the server being prompted by user inputs.

Next, at S302, the graphics processing system (e.g. using the prediction method processor 213) selects a first prediction method based on the determined network characteristics and/or server characteristics. For example, if it is determined that latencies are high, the graphics processing system may select a prediction method that reduce the latency experienced at the client device, or if it is determined that bandwidth is limited, the graphics processing system may select a prediction method that reduces bandwidth requirement when sending frames. Some examples of such prediction methods are described in more detail below. Since the first prediction method is adaptively selected based on the determined network characteristics and/or server characteristics, the graphics processing system can be adaptively operated according to the network characteristics of the communication network and/or server characteristics of the server.

In the embodiment, the selected first prediction method defines a set of criteria for generating and providing frames to the client device. Thus, at S303, the graphics processing system (e.g. the GPU 212 of the server 210) generates one or more frames based on the first prediction method. According to the present embodiment, the criteria defined by the first prediction method are applied (e.g. by the prediction method processor 213 to the GPU 212) to the generation of frames. For example, the first prediction method may specify a lower or higher image quality at which frames are to be generated, or it may specify one or more sets of frames are to be generated.

The generated frames are selectively provided, at S304, for the application being executed at the server based on the first prediction method, and the selected frames are output for transmission to the client device. According to the present embodiment, the criteria defined by the first prediction method are applied (e.g. by the prediction method processor 213) to the selection of output frames. For example, the first prediction method may specify selection of a subset of the generated frames, or it may specify selection of only every other generated frame.

At S305, the selected output frames are compressed and sent, e.g. over the network connection 290, to the client device. Optionally, the compressed output frames may be sent together with an indication indicating that the first prediction method has been selected.

Upon receiving the compressed frames, at S306, the client device decompresses the compressed frames, and applies (e.g. by the prediction method processor 223 on the client device 220) the first prediction method, e.g. indicated by an indication received from the server, to the decompressed frames at S307. In the embodiment, the first prediction method defines one or more operations to be performed (e.g. by the prediction method processor 223) on the decompressed frames to produce frames for display. For example, the first prediction method may instruct the client device to select some but not all of the frames for display, or it may instruct the client device to manipulate the frames before outputting for display, or to generate additional frames for display.

At S308, after being processed by the first prediction method, the frames are output (e.g. by the display controller 224) for display (e.g. on the panel 240).

Since the first prediction method is adaptively selected and applied to the generation and selection of frames output by the graphics processing system based on the current network characteristics of the communication network and/or server characteristics of the server, it is possible for the graphics processing system to adaptively provide frames for an application according to current network characteristics and/or server characteristics, thereby adaptively addressing issues that may arise from latencies and bandwidth limitations.

It will be appreciated by those skilled in the art that fluctuations and instabilities in the communication network and the channels in the communication network occur from time to time. Thus, in an embodiment, the determination of available network resources S301, and therefore the selection of a first prediction method S302, may be repeated periodically to account for any such fluctuations. Alternatively or additionally, the determination of network characteristics of the communication network and/or server characteristics of the server S301 and the selection of a first prediction method S302 may be performed only upon detection of a change in network characteristics and/or server characteristics, for example, if the network connection between the server and the user has changed from a wi-fi connection to a mobile connection, or if other client devices have joined the same network connection. In doing so, it is possible to continually adapt to current network characteristics and/or server characteristics when operating the graphics processing system to provide frames for an application.

In an embodiment of one such prediction method, a subset of the generated frames, representing a plurality of possible (e.g. most likely) predicted future states for the application can be provided by the server 210 to the client device 220, where they may be suitably processed by the local CPU 221 (and/or local GPU 222). At least some of the frames may be passed to the display controller 224 of the client device 220. When further user inputs are received, the display controller 224 can be programmed by the CPU 221 to select for display, from the different possible future states for which frames have been generated in advance and e.g. stored in the off-chip memory 227, the appropriate future state that matches the current state of the application determined e.g. by the current user input, and display the frame sequence associated with the appropriate future state.

According to this embodiment, the GPU 211 of the server 210 is operated to continually (e.g. until a different prediction method is selected) generate frames for a plurality of different future states in advance of their being required for display at the client device 220, and to continually update the future states for which frames are produced based on new user inputs received.

Figure 4:
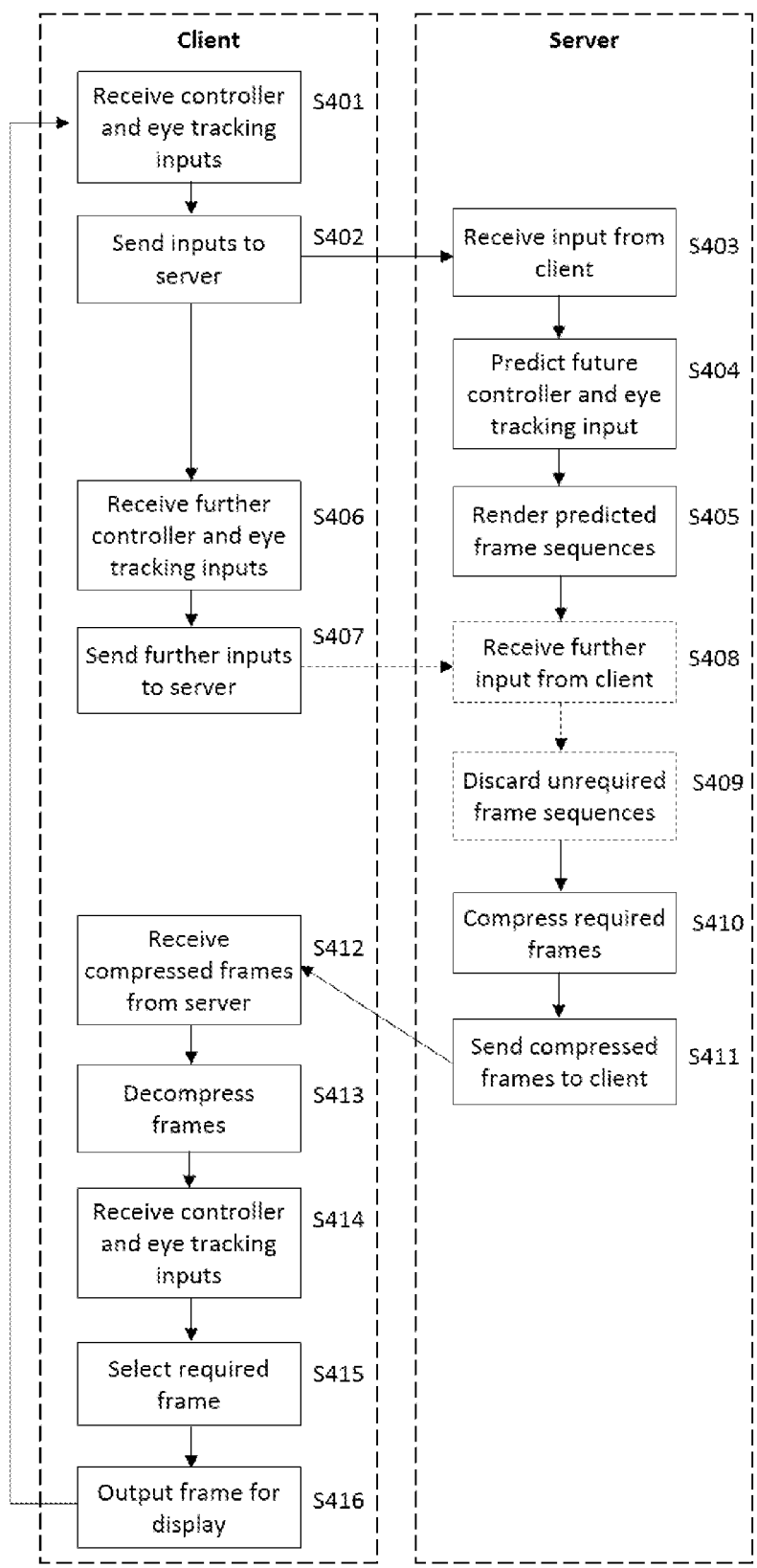
FIG. 4 shows a flow diagram illustrating an exemplary method based on negative latency techniques.

An embodiment of this prediction method is illustrated in FIG. 4. The method begins at S401 when the client device (e.g. the client device 220) receives inputs from a user, such as inputs from the controller 260 and/or inputs from the eye tracker 250, and sends the user inputs to the server (e.g. the server 210) at S402.

Upon receiving the user inputs from the client device at S403, the graphics processing system on the server (e.g. the CPU 211 or the prediction method processor 213) predicts, at S404, possible future user inputs such as controller inputs and/or eye tracking inputs based on the received user inputs and, optionally, user inputs received previously from the client device. Using the predicted future user inputs, the graphics processing system (e.g. the GPU 212) renders a plurality predicted frame sequences at S405, each frame sequence corresponding to a possible predicted future state of the application according to a particular, or a particular set of, predicted future user input(s). The graphics processing system may, at this point, send all of the plurality of predicted frame sequences to the client device, for example, if it is determined that there is a good bandwidth availability and high latencies. However, in preferred embodiment, so as to preserve bandwidth, the graphics processing system may store the rendered frame sequences e.g. in the off-chip memory 217 and await further inputs from the client device so as to select a subset of frames from the plurality of predicted frame sequences.

Thus, at S406, the client device receives further user inputs from the controller 260 and/or eye tracker 250, and sends the further user inputs to the server at S407.

Upon receiving the further user inputs at S408, the graphics processing system selects a subset of frames or frame sequences corresponding to one or more possible future states of the application based on the further user inputs from the plurality of frame sequences generated at S405, and discards the unrequired frame sequences at S409 which do not correspond to the further user inputs. The selected frame sequences are compressed at S410 and sent to the client device at S411.

In the present embodiment, the number of different future frames generated may depend on the expected prediction accuracy and the number of likely scenarios, e.g. based on the current user input. Moreover, the number of frames generated for each frame sequence may depend on the latency of the system (e.g. input latency, frame generation latency, frame output transfer latency, etc.).

Upon receiving the compressed frames from the server at S412, the client device decompresses the frames at S413 and e.g. store the decompressed frames in a frame buffer in the off-chip memory 227.

When the client device receives further user inputs e.g. from the controller 260 or the eye tracker 250 at S414, the client device selects the frame or frames required by the received user inputs at S415, and output the selected frame or frames for display at S416.

According to this embodiment, the graphics processing system effectively treats the current user inputs as a precursor that can lead to a number of possible future states of the application, and anticipates these possible future states by generating a frame sequence for each possible future state in advance before the frame sequence is required (e.g. confirmed by further user inputs). In doing so, the frames are available to the client device before they are required for responding to user inputs. It is therefore possible to respond to user inputs quickly, thereby reducing the effect of latencies in the generation of frames and/or in the communication network.

In a head-mounted display operation, for example to provide a virtual reality (VR) or augmented reality (AR), appropriate frames to be displayed to each eye may be rendered by the GPU 212 in response to appropriate commands and data from the application that requires the display. In such arrangements, the system may also operate to track the movement of the head/gaze of the user (head pose (orientation) tracking) (e.g. by the eye tracker 250). This head orientation data is then used to determine how the images should actually be displayed to the user for their current head position (view orientation), and the image frames are rendered accordingly (e.g. by setting the camera orientation based on the head orientation data), so that an appropriate image frame based on the user's current direction of view can be displayed.

While it may be possible to determine the head orientation at the start of the graphics processing unit rendering a frame to be displayed in a VR or AR system, and then to update the display (e.g. panel 240) with the frame once it has been rendered, due to latencies in the rendering process, the user's head orientation may have changed between the sensing of the head orientation at the beginning of the rendering of the frame and the time when the frame is actually displayed. Moreover, it is often desirable to provide frames for display in a VR or AR system at a rate (e.g. 90 fps or 120 fps) that is not supported by many conventional GPUs. The problem of latency is even more significant when frames are generated and provided remotely from the client device which receives user inputs.

A process known as "timewarp" has been proposed for head-mounted display systems. In this process, an application frame is first rendered by the GPU based on the head orientation data sensed at the beginning of the GPU rendering the application frame, but then before an image is actually displayed, further head orientation data is sensed, and that further head orientation sensor data is used to transform the GPU rendered application frame to generate an updated version of the application frame that takes account of the further head orientation data. This "timewarped" updated version of the application frame is then displayed.

However, while such "timewarp" processing takes into account changes to head orientation during the time period between the point in time at which the first head orientation is sensed and the point in time at which a second (further) head orientation is sensed, it does not account for changes due to the motion of objects within the scene during the same time period. To account for object motion when performing "timewarp" processing, a process known as "spacewarp" processing has been proposed. This process takes into account motion of objects when a "timewarped" frame is to be generated, by extrapolating moving objects shown in the application frame to expected positions at that later point in time, with the "timewarp" processing then being performed on the basis of the extrapolated objects. The "timewarped" and "spacewarped" updated version of the application frame is then displayed.

"Timewarp" processing and "spacewarp" processing can typically be performed in parallel with (using a different thread to) the rendering of application frames, i.e. asynchronously. Thus, these processes are often referred to as "asynchronous timewarp" (ATW) processing and "asynchronous spacewarp" (ASW) processing.

In an embodiment of the present techniques, ASW processing may be used as one of the prediction methods.

According to an embodiment, the ASW processing involves processing image data of the current and optionally previous GPU rendered application frames to determine the motion of any objects between frames. The determined object motion is then extrapolated forward in time to generate an extrapolated version of the current application frame, showing moving objects at their predicted (extrapolated) positions at a later point in time.

In the present embodiment, while rendering the current frame, the GPU may further generate depth information and/or one or more motion vectors for the objects shown in the current frame, and use the depth information to determine the depth of the objects within the frame and/or use the motion vectors of the objects to determine the motion of the objects within the frame. This way, it is possible to efficiently predict the motion of the objects within the frame and thereby efficiently extrapolate the expected positions of the objects.

Figure 5:
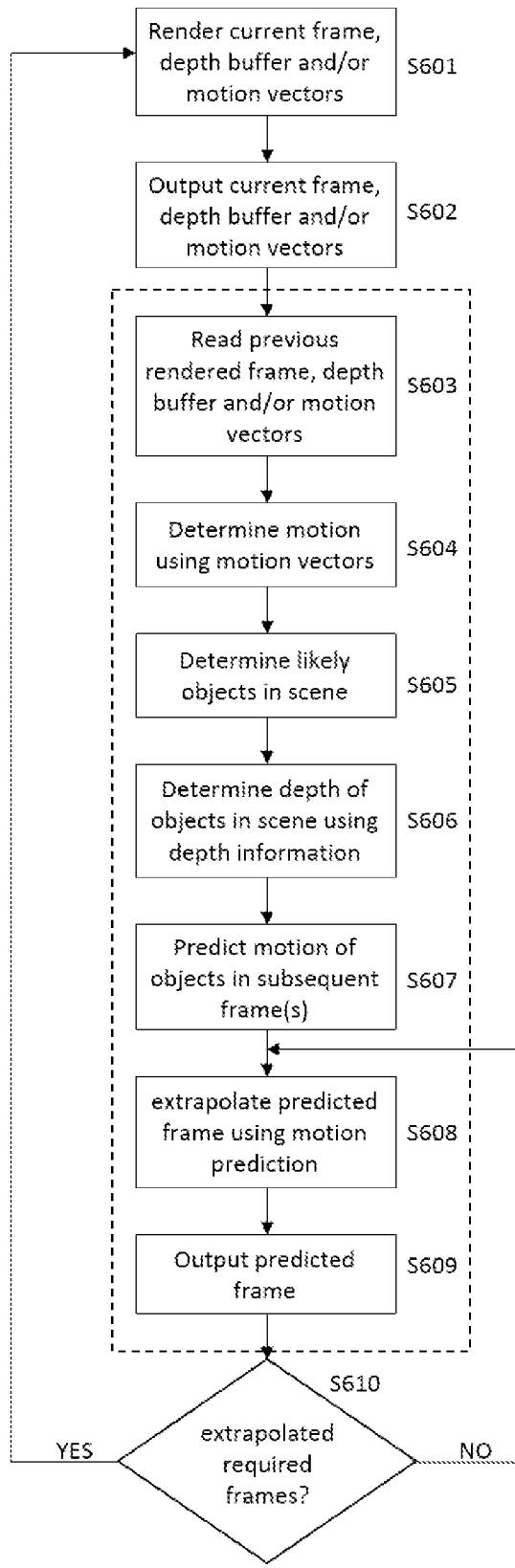
FIG. 5 shows a flow diagram illustrating an exemplary method based on asynchronous space warp techniques.

An exemplary ASW processing is illustrated in FIG. 5. At S601, the GPU (e.g. the GPU 212 at the server 210) renders a current frame, and optionally a depth buffer containing depth information of the objects in the current frame and/or motion vectors representing the motion of the objects in the current frame. The GPU then outputs the current frame at S602, optionally together with the depth buffer and/or motion vectors.

The following functionality may be performed at the server, e.g. by GPU 212 of the server 210, or at the client device, e.g. by GPU 222 of the client device 220, as desired. In the present embodiment, this functionality is performed at the client device. At S603, a preceding frame that was rendered before the current frame is read. In embodiments where motion vectors of the objects in the current frame are received with the current frame, the motion vectors of the objects are read to determine the motion of the objects in the current frame at S604. If motion vectors are not available but the respective depth information of the objects is sent with the current and previous frames, the depth information is read and the motion of the objects in the current frame may be determined using the image data of the current and previous frames together with the depth information. Using the determined motion of each object, at S605, objects that are likely to be present in the scene of the current frame are determined.

At S606, the depth (e.g. with respect to the plane of the display) of each object in the scene of the current frame is determined where motion vectors are not available. In embodiments where a depth buffer is sent with the current and previous frame(s), depth information of the objects contained in the depth buffer can be used to determine presence of the objects and their movement in the current frame, to generate one or more motion vectors for the objects. In embodiments where neither motion vectors nor depth information is sent, then the current frame is compared with the previous frame(s) to determine depth information of the objects in the current frame, and generate motion information (e.g. motion vectors) of the objects in the current frame from the depth information and image data of the current and previous frames.

At S607, the motion of each of the objects in a subsequent (predicted) frame is predicted based on the determined object motions in the current frame, determined based on a motion vector of each object or pixel in the current frame, depth information of each object or pixel, or, if neither motion vectors or depth information is available, a comparison of image data of the current and previous frames. Then, using the predicted motion, at S608, a predicted frame is extrapolated. The predicted frame is output, at S609, for display.

In some embodiments, one predicted frame is generated from each rendered frame, in which case the frame rate at which frames are displayed at the client device is effectively doubled. In other embodiments, it may be desirable to generate more than one predicted frame from each rendered frame to further increase the frame rate at which frames are displayed with respect to the frame rate at which frames are received by the client device, for example when latencies are particularly high. Thus, at S610, it is determined whether all required predicted frames have been extrapolated. If so, the method returns to S601 at which a new frame is rendered. If not, the method returns to S608 at which a further predicted frame is extrapolated.

In the present embodiment, the functionality at S603 to S609 may be performed at the client device, in which case at S602, the GPU at the server outputs the current frame and optionally the depth buffer and/or motion vectors, then compresses the current frame and optionally the depth buffer and/or motion vectors and sends the compressed current frame and optional depth buffer and/or motion vectors to the client device. Then, after the client device (e.g. the GPU 222 and or the prediction engine 223) completed the processing from S603 to S608, at S609, the client device outputs the predicted frame for display. The functionality at S603 to S609 may, in an embodiment, be performed also at the server, then at S609, the predicted frame is output for comparison, as described below.

Figure 6:
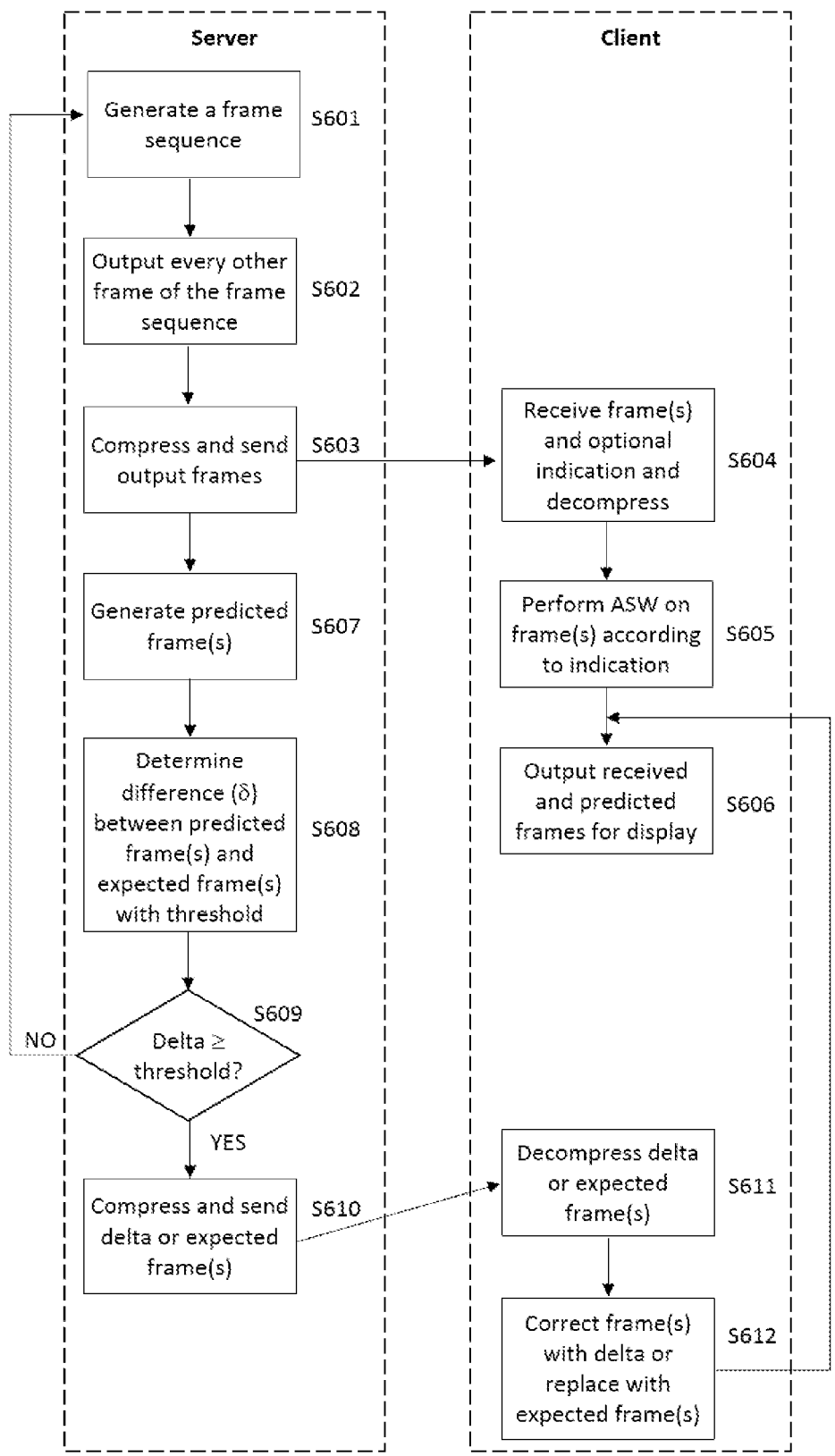
FIG. 6 shows a flow diagram illustrating an exemplary error correction method.

There may be instances when an error may occur during ASW processing. For example, in a sequence of frames in which a ball is bouncing up and down, the ball is falling in the current frame and in the subsequent frame (as generated by the GPU at the server), the ball hits the ground; however, a predicted frame extrapolated from the motion of the ball may instead show the ball continues to fall. If an error occurs during any of the stages of ASW processing (e.g. assumption that the ball continues to fall based on the motion of the ball), the error may propagate to the resulting predicted frame(s) (e.g. the ball being shown to continue to fall instead of hitting the ground). If the error is small, it may not affect the user's experience of the application (e.g. game) and the error may go unnoticed. However, for a larger error or multiple errors in a given frame, it may have a significant negative effect on user experience. Thus, the present techniques further provide a method of determining an error in a predicted frame and methods of correcting the error. FIG. 6 illustrates an example of such methods.

In an embodiment, the graphics processing system at the server (e.g. the server 210) generates a frame sequence at S601 for display, and outputs some but not all of the frames in the sequence according to the selected prediction method at S602. For example, the graphics processing system may output every other frame of the frame sequence, every third frame of the frame sequence, every fourth frame of the frame sequence, etc. Then at S603, the graphics processing system compresses and sends an output frame to the client device (e.g. the client device 220) for processing and display.

Upon receiving the compressed frame and optionally an indication indicating an ASW processing is to be applied to the received frames at S604, the client device decompresses the received frame and performs ASW processing on the decompressed frame at S605 as described with reference to FIG. 5. Then, at S606, the client device outputs the received frame and a predicted frame generated by the ASW processing for display. It should be noted that in embodiments where an indication is provided by the server, the client device may select the prediction method as indicated by the indication amongst a plurality of prediction methods stored e.g. on the device. In embodiments where an indication is not provided by the server, the client device may alternatively determine an appropriate prediction method amongst a plurality of prediction methods available e.g. that are stored on the device based on the received frame or frames and the current performance characteristics of the client device, e.g. processing capability, memory capacity, display resolution, etc.

Returning to the server, at S607, the graphics processing system generates a predicted frame by performing the same ASW processing as the client device on the output frame to generate a predicted frame. Then, at S608, the graphics processing system determines a difference (delta) between the generated predicted frame and an unsent frame subsequent to the output frame in the frame sequence, which was not output for transmission to the client device, to obtain a delta between the predicted frame and the unsent frame. Since the ASW processing is performed to extrapolate a frame that is subsequent to the output frame, the so-extrapolated predicted frame is expected to be the same as or similar to the unsent frame that is subsequent to the output frame in the frame sequence. By comparing the predicted frame with the unsent frame that is the expected frame, it is possible to detect any discrepancy between the predicted frame and a frame that is intended to be displayed.

At S609, the graphics processing system compares the delta with a predetermined threshold to determine whether an error is present in the predicted frame and whether the error is significant (if the error requires correction). If it is determined that the delta is below the predetermined threshold, the method returns to S601 and begins again with the generation of a new frame. If it is determined that the delta is at or above the predetermined threshold, at S610, the graphics processing system compresses and sends either the delta, or the expected frame, or both to the client device.

Upon receiving the compressed delta and/or the compressed expected frame at S611, the client device decompresses the compressed delta and/or the compressed expected frame. Then, at S612, the client device either corrects the predicted frame generated at S605 and outputs the corrected frame for display at S606, or replaces the predicted frame generated at S605 with the expected frame and outputs the expected frame for display at S606.

In an embodiment, the plurality of prediction methods may include a technique known as temporal anti-aliasing (TAA) or machine learning super sampling (MLSS) (e.g. DLSS™).

When generating a frame, the graphics processing system may in addition generate one or more motion vectors for the frame. The one or more motion vectors may be per-pixel motion vector each representing the motion of a pixel of the frame. The one or more motion vectors may each represent the motion of a region of the frame, for example a group of pixels with a predetermined number of pixels, a part of an object in the frame, an object primitive of an object in the frame, or an object in the frame.

When outputting the frame, the graphics processing system may output the frame at a lower image quality than the image quality intended for display, for example by generating the frame at the lower image quality and/or by compressing the frame using a lossy compression technique. The lower image quality frame is then sent to the client device together with the one or more motion vectors for the frame. Upon receiving (and decompressing) the frame and the one or more motion vectors, the client device can then apply a known TAA or MLSS processing using the one or more motion vectors to render the frame at the intended image quality for display.

The above-described and other prediction methods may be used alone or in any desirable combination, for example depending on the network characteristics of the communication network and/or server characteristics of the server. In an embodiment, the graphics processing system may adaptively select a second prediction method to be applied in conjunction with the first prediction method. For example, if latencies are high, the graphics processing system may select to apply a negative latency technique and output a number of predicted frame sequences for corresponding future states of the application. However, this may increase bandwidth requirement as a result of sending more frames than needed for display. Thus, the graphics processing system may simultaneously or subsequently apply ASW processing to output only some but not all of the frames in the output predicted frame sequences to conserve bandwidth. In another example, to conserve bandwidth resources, the graphics processing system may instead simultaneously or subsequently apply a TAA technique to the output predicted frame sequences.

It will be apparent to those skilled in the art that there are many other suitable methods of selecting, manipulating or otherwise operating on frames generated by a graphics processing system at a server prior to or after such frames are sent to a client device for display, which can reduce latency and/or bandwidth requirement and/or other limitations and fluctuations that occur in the channels or the network, that can be used adaptively as one of the plurality of prediction methods as implemented in the presently disclosed techniques. Thus, it will be appreciated that the present techniques are not limited to the prediction methods described herein.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the elements of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be clear to one skilled in the art that many improvements and modifications can be made to the foregoing exemplary embodiments without departing from the scope of the present techniques.

What is claimed is:

1. A method of operating a graphics processing system on a server for providing frames over a communication channel in a communication network, said graphics processing system being configured to process data for an application executed thereon to render frames for said application to be output for transmission over said communication channel to a client device, the method comprising:
    determining at least one of current network characteristics of said communication network and current server characteristics of said server;
    adaptively selecting a first prediction method from a plurality of prediction methods to be used for displaying frames based on said at least one of determined current network characteristics and current server characteristics, wherein said plurality of prediction methods each defines criteria for how frames are generated at the graphics processing system and criteria for how the generated frames are provided to the client device;
    generating, substantially in real-time, a plurality of frames in accordance with the first prediction method;
    selecting, in accordance with said first prediction method, an output frame from said plurality of generated frames and providing said output frame to said application to be output for transmission to the client device over said communication channel in accordance with the first prediction method;
    determining a transmission frame rate at which frames are the output frame to be transmitted over said communication channel based on said at least one of determined current network characteristics and current server characteristics;
    providing to the client device, in accordance with the transmission frames rate, the output frame, an indication indicating the first prediction method and extrapolation information to enable the client device to process the output frame and generate one or more predicted frames for display in accordance with the first prediction method and extrapolation information,
    wherein said plurality of prediction methods comprises one or more negative latency techniques, one or more temporal anti-aliasing techniques, one or more machine learning super sampling techniques, or one or more asynchronous space warp techniques, or a combination thereof.

2. The method of claim 1, wherein said plurality of frames are generated based on a display frame rate at which frames are to be displayed at said client device.

3. The method of claim 1, wherein said first prediction method comprises generating said plurality of frames as a plurality of frame sequences, wherein each frame sequence comprises a respective sequence of one or more frames corresponding to a different predicted future state for said application, and wherein selectively providing one or more output frames comprises selectively providing a subset of said generated frame sequences corresponding to a respective subset of predicted future states for said application.

4. The method of claim 1, wherein said first prediction method comprises generating said plurality of frames at an image quality lower than the image quality for display, and providing each of said one or more output frames with respective one or more motion vectors, wherein each motion vector represents a motion of a region of the output frame to be used for predicting a position of the region, wherein said image quality at which said plurality of frames is to be generated is determined based on said at least one of determined current network characteristics and current server characteristics.

5. The method of claim 1, wherein said generated plurality of frames comprises a sequence of frames, and selectively providing the frame from said generated plurality of frames to said application comprises providing a frame from said sequence of frames, and said predicted frame corresponds to a frame from said sequence of frames other than said subset of frames.

6. The method of claim 1, wherein said predicted frame corresponds to an unsent frame that is a frame from said generated plurality of frames other than said output frame, the method further comprising:
generating a predicted frame by applying said first prediction method using said extrapolation information, and
determining a difference between said predicted frame and said unsent frame.

7. The method of claim 6, further comprising comparing said difference with a predetermined threshold, and, if it is determined that said difference is at or above said predetermined threshold, providing said unsent frame and/or said difference to said application to be output for transmission.

8. The method of claim 1, further comprising adaptively selecting a second prediction method from said plurality of prediction methods to be used in conjunction with said first prediction method for displaying frames based on said at least one of determined current network characteristics and current server characteristics, wherein said plurality of frames are generated based on said first prediction method and said second prediction method, and said one or more output frames are selectively provided to said application based on said first prediction method and said second prediction method.

9. The method of claim 1, further comprising:
applying a compression algorithm to said one or more output frames; and
outputting the compressed output frames for transmission.

10. The method of claim 1, wherein said plurality of frames are generated based on a display frame rate at which frames are to be displayed at said client device, and wherein said transmission frame rate is set to be:
same as said display frame rate;
less than said display frame rate; or
half of said display frame rate.

11. The method of claim 1, further comprising repeating said determining at least one of current network characteristics and current server characteristics and the adaptive selection of a first prediction method:
periodically at a predetermined interval; or
upon detecting a change in said at least one of current network characteristics and current server characteristics.

12. A computer-implemented method of displaying frames for an application at a client device connected to a server via a communication channel in a communication network, the method comprising:
at the client device:
receiving, from the server, an input frame generated at the server substantially in real-time in response to current characteristics of said communication network and an indication indicating a first prediction method selected from a prediction methods, wherein said first prediction method determines how said input frame is to be processed at the client device to generate one or more output frames for display;
applying said first prediction method to said plurality of input frames to produce one or more frames for display;
receiving extrapolation information for said input frame, wherein applying said first prediction method to said input frame comprises:
determining one or more objects in said input frame;
determining motion of each determined object in said input frame using said extrapolation information; and
generating one or more predicted frames based on said determined motion of each determined object, where the one or more predicted frames are subsequent to the input frame based on the motion of the one or more objects; and
outputting said one or more generated predicted frames for display,
wherein said plurality of prediction methods each determines how frames are generated and selected for provision to the application, said plurality of prediction methods comprises one or more negative latency techniques, one or more temporal anti-aliasing techniques, one or more machine learning super sampling techniques, or one or more asynchronous space warp techniques, or a combination thereof.

13. The method of claim 12, further comprising:
receiving a difference between said predicted frame and an expected frame, and correcting said predicted frame based on said difference; or
receiving an expected frame and replacing said predicted frame by said expected frame.

14. A computer-implemented method of displaying frames for an application at a client device connected to a server via a communication channel in a communication network, the method comprising:
at the client device:
receiving, from the server, an input frame generated at the server substantially in real-time and extrapolation information for said input frame;
determining one of a plurality of prediction methods to be applied to said input frame based on performance characteristics of said client device;
applying the determined prediction method to said plurality of input frames to produce one or more frames for display wherein applying said determined prediction method to said input frame comprises:
determining one or more objects in said input frame;
determining motion of each determined object in said input frame using said extrapolation information; and
generating one or more predicted frames based on said determined motion of each determined object, where the one or more predicted frames are subsequent to the input frame based on the motion of the one or more objects; and
outputting said one or more generated predicted frames for display,
wherein said plurality of prediction methods each determines how frames are generated and selected for provision to the application, said plurality of prediction methods comprises one or more negative latency techniques, one or more temporal anti-aliasing techniques, one or more machine learning super sampling techniques, or one or more asynchronous space warp techniques, or a combination thereof.

* * * * *